(12) United States Patent
Kruglick

(10) Patent No.: US 9,662,587 B2
(45) Date of Patent: May 30, 2017

(54) MATCHING SPONSORED GAME CONTENT TO LOCATION BY GENRE AND PLAYABILITY

(75) Inventor: Ezekiel Kruglick, Poway, CA (US)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 1365 days.

(21) Appl. No.: 13/498,909

(22) PCT Filed: Sep. 22, 2011

(86) PCT No.: PCT/US2011/052686
§ 371 (c)(1),
(2), (4) Date: Mar. 28, 2012

(87) PCT Pub. No.: WO2013/043174
PCT Pub. Date: Mar. 28, 2013

(65) Prior Publication Data
US 2013/0079142 A1 Mar. 28, 2013

(51) Int. Cl.
*A63F 13/85* (2014.01)
*G06Q 30/02* (2012.01)
(Continued)

(52) U.S. Cl.
CPC ............ *A63F 13/85* (2014.09); *A63F 13/216* (2014.09); *A63F 13/61* (2014.09); *A63F 13/79* (2014.09);
(Continued)

(58) Field of Classification Search
CPC .................. A63F 13/12; A63F 2300/55; A63F 2300/5506; A63F 2300/205;
(Continued)

(56) References Cited

U.S. PATENT DOCUMENTS 6,691,032 B1 2/2004 Irish et al.
7,576,727 B2 8/2009 Bell
(Continued)

FOREIGN PATENT DOCUMENTS

KR 1020060051046 A 5/2006
WO 2007037582 A1 4/2007

OTHER PUBLICATIONS

Hartley, A., "Global MMO market worth $8 billion," accessed at http://web.archive.org/web/20110916203834/http://www.techradar.com/news/gaming/global-mmo-market-worth-8-billion-709256, posted on Aug. 11, 2010, pp. 6.
(Continued)

*Primary Examiner* — Werner Garner
(74) *Attorney, Agent, or Firm* — Turk IP Law, LLC

(57) ABSTRACT

Technologies are generally described for matching sponsored game content to location by genre and playability. In some examples, a search system for finding real-environment matched gaming content for a user based at least partially on analyzed properties of potential locations may employ game script/flow information and match against local features from map data to screen content for which a game plot can be executed across appropriate areas and transitions or other physical requirements. Additionally, a broker server system may enable businesses to advertise or sponsor a game in order to get the game set up in their location. A keyword auction or similar process may be used during keyword related game organization that is also within specific geographic locations such that the game is set up with the auction winner's location as a plot related-location.

18 Claims, 7 Drawing Sheets

(51) Int. Cl.

| | |
|---|---|
| *A63F 13/216* | (2014.01) |
| *A63F 13/79* | (2014.01) |
| *A63F 13/61* | (2014.01) |
| *A63F 13/822* | (2014.01) |
| *A63F 13/65* | (2014.01) |

(52) U.S. Cl.
CPC ......... *G06Q 30/02* (2013.01); *G06Q 30/0251* (2013.01); *A63F 13/65* (2014.09); *A63F 13/822* (2014.09); *A63F 2300/205* (2013.01); *A63F 2300/5506* (2013.01); *A63F 2300/69* (2013.01)

(58) Field of Classification Search
CPC .. A63F 2300/5573; A63F 13/85; A63F 13/61; A63F 13/79; A63F 13/216; A63F 13/65; A63F 13/822; A63F 2300/69; G06Q 30/0251; G06Q 30/0241; G06Q 30/0252; G06Q 30/0255–30/0258; G06Q 30/0261; G06Q 30/02
See application file for complete search history.

(56) References Cited

U.S. PATENT DOCUMENTS

| | | | |
|---|---|---|---|
| 7,853,296 | B2 | 12/2010 | Yu et al. |
| 7,946,919 | B2 | 5/2011 | Piccionelli |
| 2004/0183775 | A1* | 9/2004 | Bell ................. G06F 3/011 345/156 |
| 2004/0204247 | A1 | 10/2004 | Walker et al. |
| 2006/0105838 | A1 | 5/2006 | Mullen |
| 2006/0281553 | A1 | 12/2006 | Hawkins, III et al. |
| 2008/0059304 | A1 | 3/2008 | Kimsey |
| 2009/0111434 | A1* | 4/2009 | Yu .................... H04L 51/14 455/414.1 |
| 2009/0291750 | A1 | 11/2009 | Herrmann |
| 2011/0028220 | A1 | 2/2011 | Reiche, III |
| 2011/0143811 | A1 | 6/2011 | Rodrguez |

OTHER PUBLICATIONS

Johnson, S., "Are You Ready For Sponsored Achievements?," accessed at http:/www.g4tv.com/thefeed/blog/post/711746/are-you-ready-for-sponsored-achievements/#ixzz1NDG0aCDS, posted on Apr. 11, 2011, pp. 2.
Orland, K., "Advertising coming to Xbox 360 achievements," accessed at http://web.archive;org/web/20090309033401/http://www.joystiq.com/2007/07/02/advertising-coming-to-xbox-360-achievements, posted on Jul. 2, 2007, pp. 19.
Schmidt-Belz, b., et al., "Location-based mobile tourist services—first user experiences," Information and communication technologies in tourism 2003: Proceedings of the International Conference in Helsinki, Finland, pp. 115-123 (2003).
Siegler, M., "MyTown Hits 1.5 Million Location-Based Gamers; Ups the Social With Version 3.0," accessed at http://web.archive.org/web/20110831141136/http://techcrunch.com/2010/03/25/mytown-3/, posted on Mar. 25, 2010.
Schmidt-Belz et al., "Location-based mobile tourist services-first user experiences," Information and communication technologies in tourism (2003): 10 pages.
International Search Report and Written Opinion PCT/US2011/052686, mailed Feb. 13, 2012.
Reid, "Design for coincidence: Incorporating real world artifacts in location based games," IEEE DIMEA, 2008.
Zivkovic et al., "Hierarchical map building and planning based on graph partitioning," in Robotics and Automation, 2006. ICRA 2006. Proceedings 2006 IEEE International Conference on (IEEE, 2006), 7 pages.
Bichard et al., Backseat Playgrounds: Pervasive Storytelling in Vast Location Based Games; Harper, M. Rauterberg, M. Combetto (Eds.): ICEC 2006, LNCS 416 (2006) 6 pages.
J. Jacob, A Mobile Location-Based Game Framework; Faculdade de Engenharia da Universidade do Porto, joao.jacob@fe.up.pt; 12 pages.
MacKaness et al., "Use of graph theory to support map generalization," Cartography and Geographic Information Science 20, No. 4 (1993): 210-221.
"Do you know there exists contents filtering in a market option?" (Jun. 20, 2011) http://www.androidpub.com/1609866.
International Preliminary Report on Patentability for PCT/US2011/052686 filed Sep. 22, 2011, mailed on Apr. 3, 2014, issued on Mar. 25, 2014.

* cited by examiner

MATCHING SPONSORED GAME CONTENT TO LOCATION BY GENRE AND PLAYABILITY

CROSS-REFERENCE TO RELATED APPLICATION

This Application is the U.S. National Stage filing under 35 U.S.C. §371 of PCT Application No. PCT/US 11/52686 filed on Sep. 22, 2011.

BACKGROUND

Unless otherwise indicated herein, the materials described in this section are not prior art to the claims in this application and are not admitted to be prior art by inclusion in this section.

The online Massively Multiplayer Online Role-Playing Game (MMORPG) market is growing at a rapid pace. Social networks have also generated a significant play-anywhere game movement, and games are now played across all consumer demographics and with many different business models. Social network games also have access to user location information resulting in location-centered games. As cloud gaming allows deployment of rich content and augmented reality (AR) or other interaction with the real environment, games are increasingly likely to take advantage of specifics of the local environment. For example, murder mystery events may be more suitable over a lengthy dinner with plenty of in-character interaction between cued events, while a spy event may take place among a dozen different shops as meeting points within a mall. Business owners may be able to advertise to players setting up a game about how their venue may be a good place to sit down for a murder mystery dinner or otherwise engage in certain games that bring players and audience members into their stores.

There presently are shortcomings in conventional gaming systems. An intelligent search or serving system may be needed to allow users to find gaming content that matches their current location for playability and that allows content creators to place guidance on the ambiance of use for quality. For example, an AR adventure game may be suitable for large open areas and may need three separate areas within a short walk from each other for playability while content quality may benefit from particular weather conditions or ambiance, such as evening or night for a murder mystery.

SUMMARY

The present disclosure generally describes techniques matching sponsored game content to location based on genre and playability. According to some examples, a method for matching sponsored game content to location may include receiving at least one of a matching term and/or a negative term, receiving location information associated with a user, determining suitable game content based on the at least one of a matching term and/or a negative term and the location information, determining an offer content based on the location information, and providing the suitable game content and the offer content.

According to other examples, a location based game content delivery system may include a game content server and an offer content server. The game content server may receive at least one of a matching term and/or a negative term, receive location information associated with a user, determine suitable game content based on the at least one of a matching term and/or a negative term and the location information, and provide the suitable game content and an offer content. The offer content server may receive location information associated with the user, determine the offer content based on the location information, and provide the offer content to the game content server.

According to further examples, a computer-readable storage medium may have instructions stored thereon for matching sponsored game content to location. The instructions may include receiving at least one of a matching term and/or a negative term, receiving location information associated with a user, determining suitable game content based on the at least one of a matching term and/or a negative term and the location information, determining an offer content based on the location information, and providing the suitable game content and the offer content.

According to yet other examples, a computing device for providing real-environment matched game content based at least partially on analyzed properties of potential locations may include a memory storing instructions and a processor coupled to the memory. The processor may execute a game content application and an offer content application. The game content application may receive at least one of a matching term and/or a negative term, receive location information associated with a user, match a game genre or statistically unlikely phrases against local descriptions based on the matching term, the negative term, and/or the location information, and provide the game content according to the matched game genre. The offer content application may receive the game content, separate location information from game content, extract contextual information for matching with auction key values, enable a plurality of businesses to bid for the offer content through an auction, and provide the offer content in conjunction with the game content. The game content application may also compare phrases from one of a search engine and/or local weather and time conditions to a game plot in order to match environmental ambiance to the game content.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
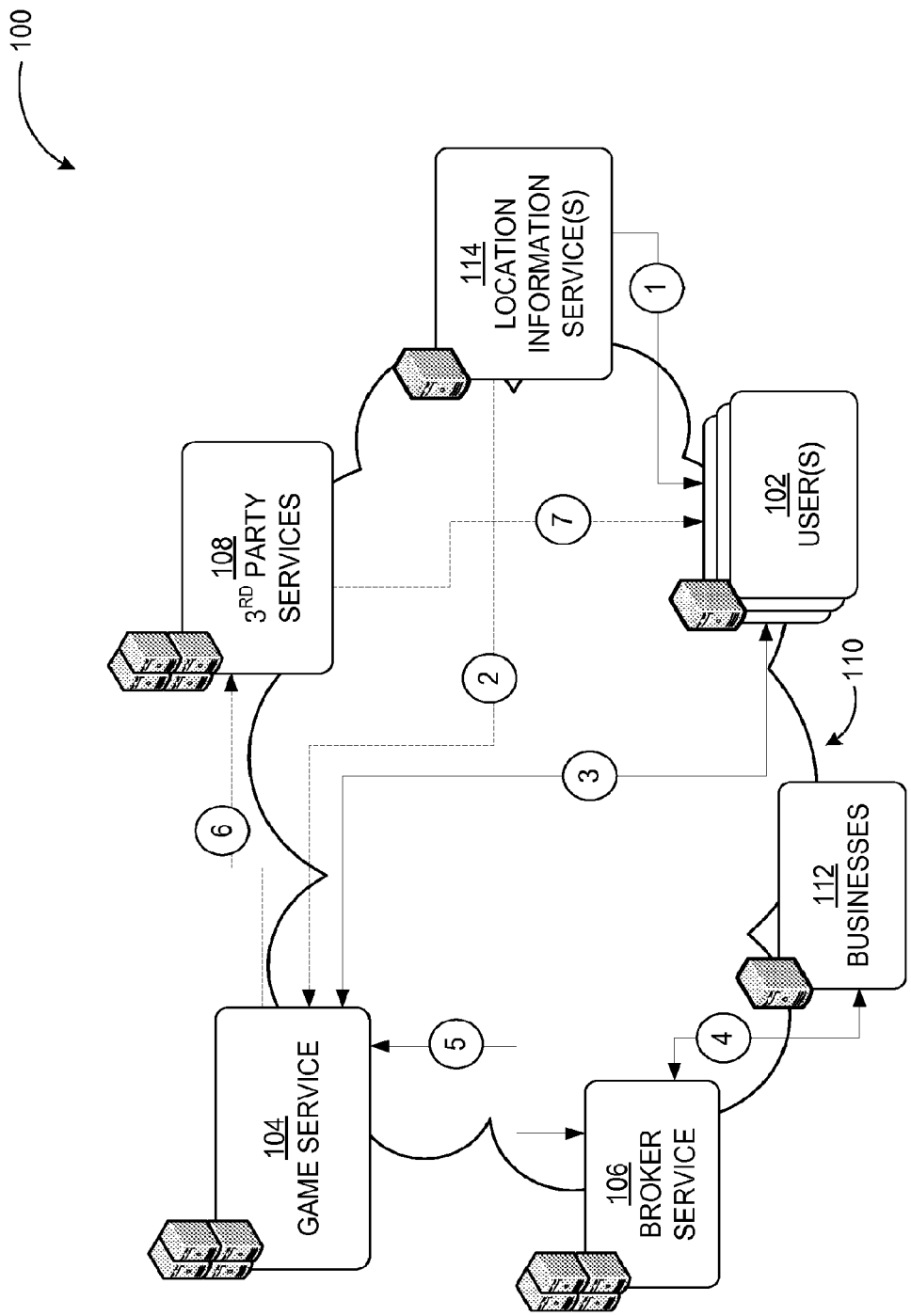
FIG. 1 illustrates an example system for matching sponsored game content to location by genre and playability.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to matching sponsored game content to location by genre and playability.

Briefly stated, a search system for finding real-environment matched gaming content for a user based at least partially on analyzed properties of potential locations may employ game script/flow information and match against local features from map data to screen content for which a game plot can be executed across appropriate areas and transitions or other physical requirements. Additionally, a broker server system may enable businesses to advertise or sponsor a game in order to get the game set up in their location. A keyword auction or similar process may be used during keyword related game organization that is also within specific geographic locations such that the game is set up with the auction winner's location as a plot related-location.

FIG. 1 illustrates an example system for matching sponsored game content to location by genre and playability, arranged in accordance with at least some embodiments described herein.

As shown in a diagram 100 in FIG. 1, a game service 104 may provide game content (3) to one or more users 102. In a system according to some embodiments, a location information service 114 may provide location information to the users 102 (1) or location information associated with the users 102 to the game service 104 (2). The location information may be current or planned. For example, current location information may be obtained from a Global Positioning Service (GPS), a wireless or wired network (to which a user's computing device is connected), or similar tracking mechanisms. Planned location information may be obtained from a scheduling service such as a user's calendar, a presence service, and comparable ones. In case of the location information service 114 providing the location information directly to the users 102, the game service 104 may receive the location information from the users 102 (e.g., along with a game request).

The game service 104 may determine candidate game content for the users 102 based on the current or planned location information and provide the game content to the users 102 directly (3) or through a third party service 108 (6 and 7). The third party service 108 may include, but is not limited to, a search engine, a content store, and/or a purchase recommendation engine. The third party service 108 may also add filtering to the game content based on user preferences or similar factors.

According to other embodiments, a broker service 106 may receive candidate game content and location information from the game service 104 and determine applicable advertising or sponsorship content (offer content) from one or more businesses 112 (4). The broker service 106 may, for example, perform a keyword auction among businesses matching the location for a user and select offer content from one or more winners of the auction. The broker service 106 may then provide the offer content (5) to the game service 104 to be provided to the users 102 along with the game content. In some embodiments, the broker service 106 may be an integral part of the game service 104 or a separate service.

A system according to some embodiments may find real-environment matched gaming content for a user based at least partially on analyzed properties of potential locations using game script/flow information and matching against local features from map data to screen content for which a game plot can be executed across appropriate areas and transitions or other physical requirements such as amount of open space, multiple levels, etc. Another function may match a game genre or statistically unlikely phrases against local descriptions such as those from a search engine and/or local weather and time conditions in order to match environmental ambiance to the game content.

The game script/flow information based location—game content matching contrasts with conventional location based information matching, which is usually limited to delivering material associated with explicitly specified locations, such as tourist services or business reviews. Thus, a system according to some embodiments does not require a specific exhaustive listing of compatible locations, instead maximizing the potential content a user may access while still assuring content creators that content may be playable and meet quality needs.

Moreover, a broker server system may enable businesses to advertise or sponsor a game in order to get the game set up in their location. A keyword auction or similar process may be used during keyword related game organization that is also within specific geographic locations such that the game is set up with the auction winner's location as a plot related-location. Each game may auction a single location or multiple locations as appropriate for the plotting, and the location based setup may be automatic or subject to user confirmation. A broker system according to some embodiments may compare to existing location based games that are generally generic and relatively location non-specific or are hard-coded by location and have a limited market. Instead, the presented approach enables businesses to tie themselves into ongoing social events involving real-world customers at their location through content prepared by other parties, and allows game producers to realize advertising revenue when the broker connects a venue with a player.

Figure 2:
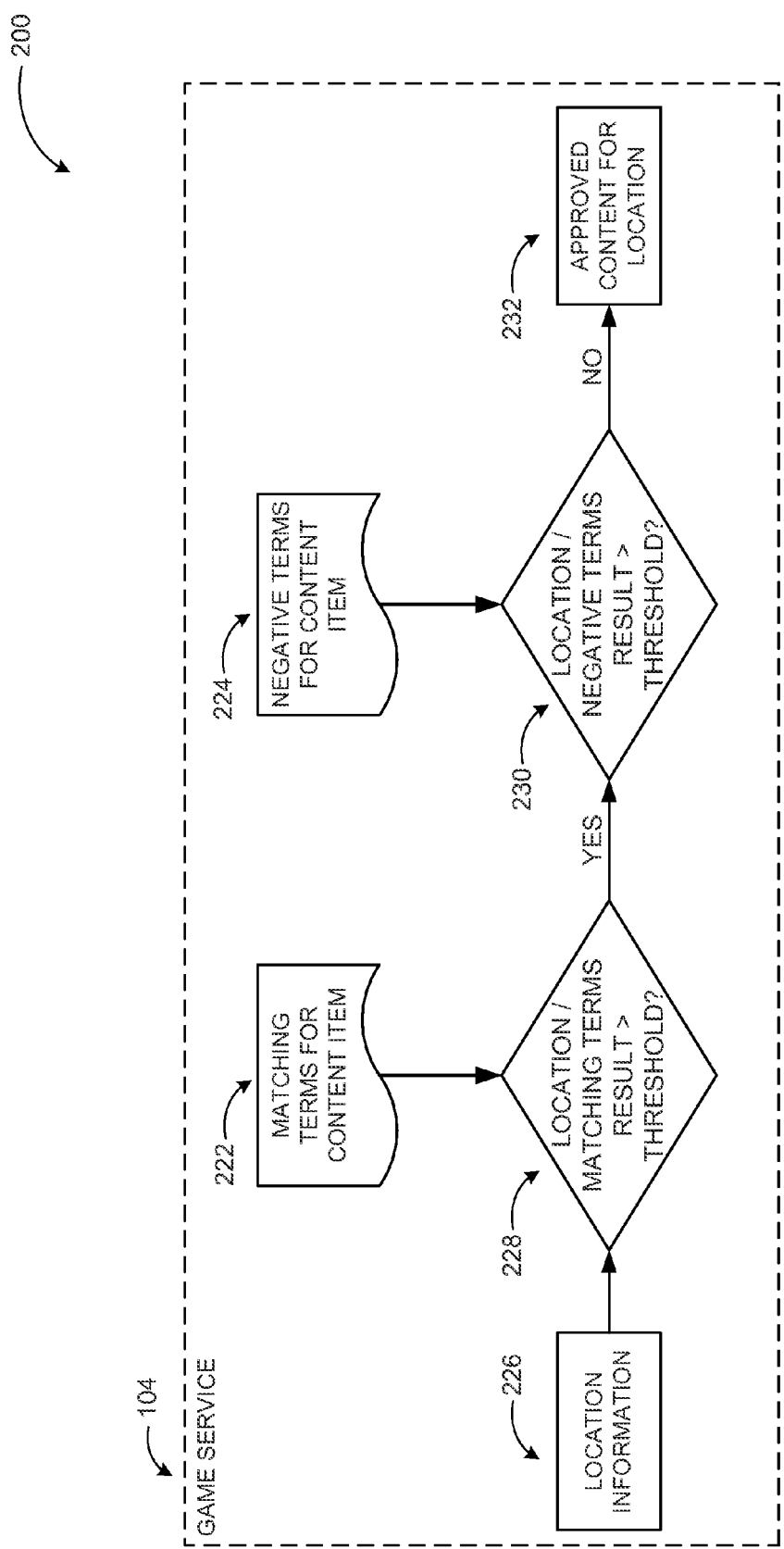
FIG. 2 illustrates a functional block diagram of an example game matching service.

FIG. 2 illustrates a functional block diagram of an example game matching service, arranged in accordance with at least some embodiments described herein.

The size of the gaming industry today and the rapid proliferation of smart personal devices and cloud services, suggests that future gaming content may be as widely varied and consumed as music or reading content. Unlike reading content and listening to music, however, location-interactive games may be managed so that they are offered in places where the location supports the game activities (e.g., games involving lots of movement while looking at a screen are probably more suitable to open spaces, and games suitable for malls or other connected indoor spaces are likely to need to relate various game plot locations to different suitable local locations and interconnections so that the plot can flow from location to location). Game creators may also seek quality improvement by incorporating certain ambiance such as time of day, weather, or locations associated with certain qualities (an antique book dealer for a historic mystery, for example). Location ambiance may also be a negative. For example, authors may attach keywords like "loud" and "chaotic" as indicators of undesirable ambient qualities to be avoided.

A system according to some embodiments may provide two major functions in determining suitable game content: script-to-location matching and ambiance matching to physical locations. These functions may be used together, individually, or as part of a larger filtering system such as a content store (e.g., an app store for mobile devices), as part of a search engine, or as part of a purchase recommendation engine (e.g., combined with other purchases and user reviews).

Games that involve the real world have a quality assurance challenge where the environment of play is typically not controlled by the content creator. For a high quality experience, however, the content creator may want harmony between the real environment and general game plot. For example, a spooky event may take place at night or outdoors while daytime and an open space may be selected for safety in a fast-paced game. Yet other ambiance matching examples may include branding associated with a game and thus may not want the brand to be associated with unpleasant locations or concepts.

In order to satisfy such quality concerns the ambiance matching function may include both "matching terms" and "negative terms", as well as a match threshold. For example, the terms may be searched against the current location and the ratio of matching and negative terms search results to overall search results compared against the threshold. For example, San Diego's Balboa Park may generate 125,000 results in a search for ["Balboa Park" and "quaint"] versus 2.5 million hits without the word quaint, for a ratio of 0.05 (e.g., probably below a threshold for most content that might want quaint surroundings). On the other hand, a search for ["Balboa Park" and "garden"], however, may bring 1.1 million hits for a ratio with the adjective-free search of 0.44. Thus, content designed for plant-filled environments may be (correctly) returned. According to some embodiments, matching and/or negative terms may be weighted and a compound score computed from the results of both negative and matching terms. The weighting or a relative importance computation may provide enhanced accuracy in determining suitable games/locations for specific users.

Ambiance information may also include lighting levels (day, night, evening) and local weather conditions, both of which may be obtained and screened by a game service. Search engines may return local real-time weather conditions and sunset timing, for example, allowing content creators to provide detailed control that can be a game feature. A game level for a couples game may be well matched at sundown on a beach to encourage romantic ambiance using this system.

Referring to FIG. 2, a diagram 200 shows a process flow for comparing location information against matching and negative terms and thresholds at the game service 104. Matching terms for a content item 222 may be used to ensure appropriate ambiance or backgrounds, or to provide an increased likelihood of related backgrounds or recognized keys for an AR based game. Negative terms for a content item 224 may be used to exclude locations and ambiance that may be undesirable or otherwise unsuitable for a particular user or game. For example, if an AR game is based on camera tracking of windows and urban features, the game service may avoid launching a game in places widely described as "garden," "pastoral," or "forest." Such tags may be added by content creators, crowd sourced, or even automatically extracted from statistically significant phrases in the game material itself. Negative terms may also be designed to avoid public relations pitfalls so that, for example, a promotional game for a violent movie is not presented to players below a certain age.

The game service 104 may receive location information 226 and perform a first decision 228 based on comparing the location information 226 and the matching terms for the content item 222 to a threshold. If the decision is affirmative, a second decision 230 may be performed comparing the location information 226 and the negative terms for the content item 224 to the same threshold or to another threshold. If the comparison for the negative terms is negative (i.e., the candidate content does not conflict with the negative terms beyond a certain threshold and matches the location), the candidate content matching the location may be approved (232).

Figure 3:
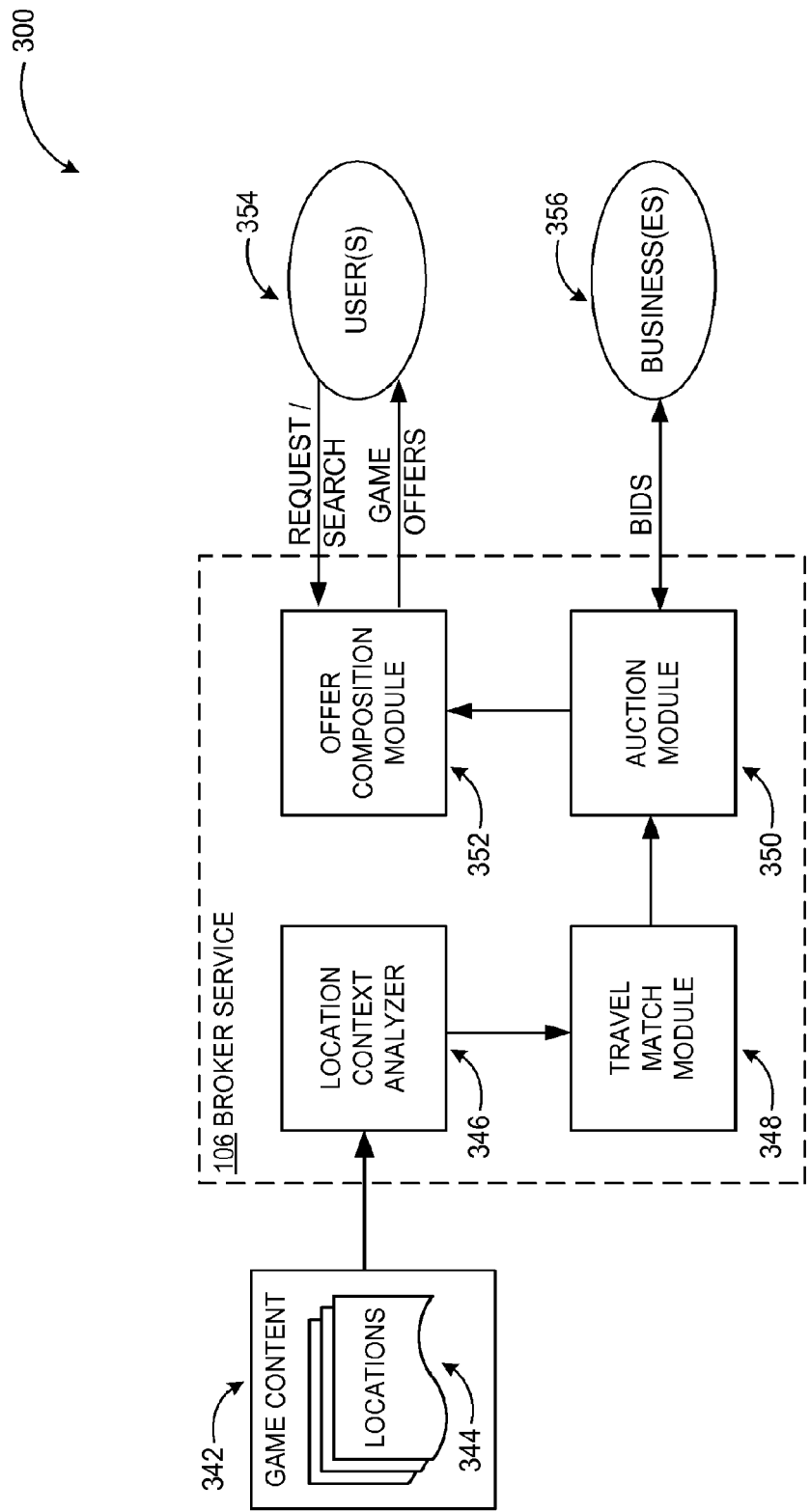
FIG. 3 illustrates a functional block diagram and interactions of an example broker service with users, businesses, and location based game content.

FIG. 3 illustrates a functional block diagram and interactions of an example broker service with users, businesses, and location based game content, arranged in accordance with at least some embodiments described herein.

In some scenarios, users may set up a game remotely (perhaps with friends) and then travel to a location, where the players can interact and play the game. Any game that involves a physical venue may incorporate an opportunity to create value by brokering the connection of businesses and players in mutually advantageous ways. In a system according to some embodiments, the content creator does not need to attempt to make an explicit listing or catalogue of appropriate places allowing management of brand associations and experience on a global scale quickly and easily.

Referring to FIG. 3, a diagram 300 depicts the broker service 106 along with entities interacting with it such as game content 342, users 354, and businesses 356. The broker service 106 may serve as an intermediary between the users 354, the businesses 356, and the game content 342. In an example scenario, a business may make bids in an auction or otherwise offer value through an auction module 350 providing both targeted key values and location information for the advertised venue (which may include both an actual location and an area or distance within which to match the key values).

When a user requests or searches for the game content 342 through the broker service 106, the broker service 106 may retrieve appropriate game content. The appropriate game content may have one or more locations 344 needed for play. A location context analyzer 346 may separate out locations from content and extract contextual information for matching with auction key values. Building a database of such location key values may take place in advance of the search. Next, the travel match module 348 may match the location key values to relevant auctions in the auction module 350 while also applying travel related analysis (so that, for example, an offered combination of sponsored offers do not result in frustrating back and forth travel). According to some embodiments, searching within certain proximity to the user or a declared destination may be performed. For example, when meeting friends, a player may choose a mall and indicate they will be walking, thus setting a center and reasonable range for matches. Appropriate auction winners may then be ranked and an overall offer or result composed by an offer composition module 352 for the user possibly incorporating multiple game locations, which may each represent an outcome of a different auction. The result, combined with notices and/or offers from the auction winners, may then be delivered as a set of game offers back to the requesting user. For example, a user may look for a dinner murder mystery and may receive multiple potential dinner murder games with different themes (e.g., Orient express, Mafia, Spy) and each of those themes may trigger different restaurant offer matches (e.g., Persian food, Italian food with a 10% discount, British food with an offer for waiters to support the plot) for the user to select among—providing players with multiple food and game options and discounts, as well as a one touch game/location set up.

In some embodiments, a location choice may be subject to a user confirmation promoting an auction winner to a top default spot, which the user may configure according to their preferences. Businesses 356 may also be able to deliver a message such as a code to provide on arrival for a discount or to have employees adopt appropriate roles in the game. To assist in this participation, a confirmed acceptance of a location may trigger a notification back to the businesses 356 including the game, players, and appropriate details.

Travel related analysis may be performed through computations for providing travel directions by optimizing each compound offering of an entire game content to provide locations relatively near each other. This may involve providing multiple sponsored offerings and ranking them by the combination of the values provided by the businesses. For example, an event that involves a particular retail store and a restaurant may return two different store-restaurant combinations, each pairing including two locations near each other but perhaps distant from the members of the other combination. Incentives to players may vary from paying the cost of a game through offering "points" on a scoreboard, or in the form of merchandise credit or discount.

Figure 4:
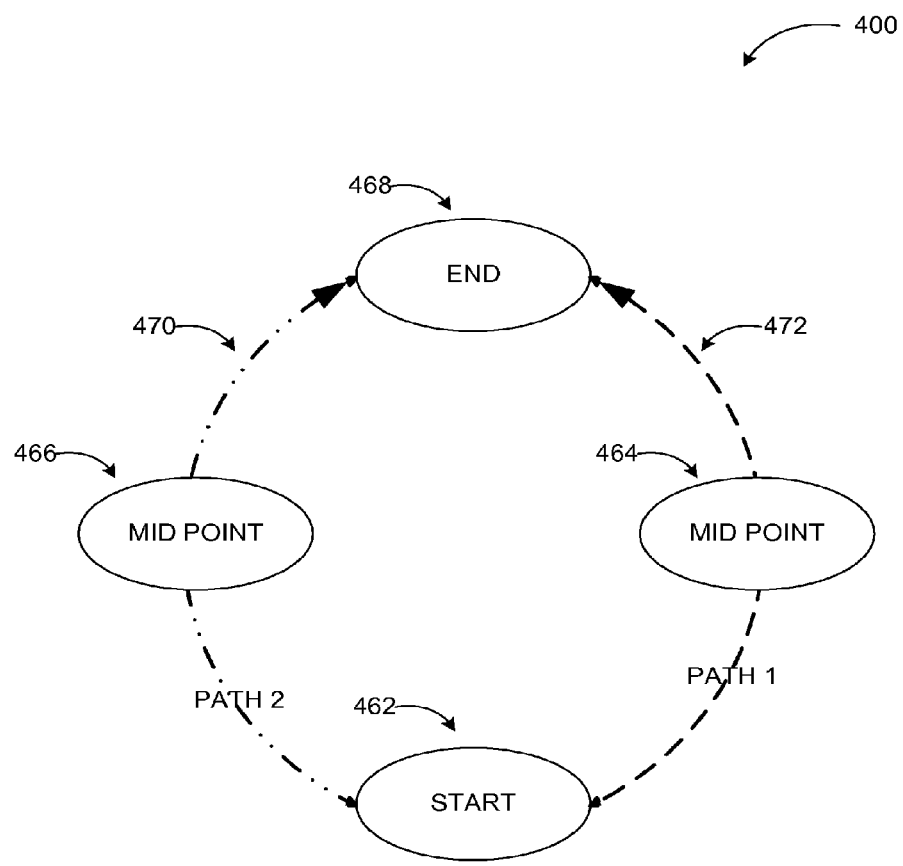
FIG. 4 illustrates an example graph of a multi-path game, where script matching may be employed.

FIG. 4 illustrates an example graph of a multi-path game, where script matching may be employed, arranged in accordance with at least some embodiments described herein. Game content may typically include both scripting and maps. For local-interaction gaming, there may be many ways of representing different locations to interact with, from fixed pattern maps to flexible structured events that can be fit to locations of opportunity.

A diagram 400 of FIG. 4 includes a graph of an example simple, three-state, multiplayer game with a start 462, two potential midpoint events 464 and 466, and an end 468. A group of people may play the game starting from their current location. Since there are multiple players, it may be undesirable to use the same location as the midpoint for both potential outcome paths 470 and 472, as players would likely encounter sights and sounds of players engaging in an alternate plot at a shared midpoint. Thus, the script may employ four total locations and two paths with particular connectivity for playability.

The game's two potential plot directions are represented by the paths 470 and 472 through the midpoints 464 and 466 to the end point 468. For replay value, dramatic tension, or even secrecy if the players are on competing teams, the players may use different midpoints. This and other, more complex plots, may be expressed as a graph diagram (or directed graph), which can be created explicitly by content authors or automatically generated. The match function may then use established location maps or specialized online maps to determine such paths from the existing or indicated location.

In order to affect a search starting at the present location (or any specified location) and finding content that fits, a system according to some embodiments may first use an existing map repository and retrieve a graph with N levels of depth, where N is a search parameter with a reasonable default probably, starting at the indicated location. As a second step, the extracted local location graph may be applied against the graphs of potential content. The return result may be content with a graph structure compatible with starting from the specified location. Retrieved graphs/maps may be subjected to keyword matching and sponsor auctioning as discussed above.

It should be noted however, that content may benefit from more fine-grained location screening. While fine-grained location screening may make the individual search more complex, it may be performed by, for example, taking candidate graphs and comparing each location against specifications using auxiliary data layers like topology or even analyzing the satellite imagery of a location.

A game service according to some embodiments may help match games to locations, and as such the games may be augmented by a system for recording locations, where individuals may have played the game to add a social element to the discovery (e.g., recording the score from various locations). Such a tagging system may encourage discovery of games that others have discovered to work in particular locations using the solution provided. According to further embodiments, a game or a subset of games may be indicated and queried if there is a position to play from anywhere within a particular area or distance. Such a system may simply take possible start points within the indicated area and evaluate each as described above in order to present a map of potential starting points to the user.

While embodiments have been discussed above using specific examples, components, and configurations in FIG. 1 through FIG. 4, they are intended to provide a general guideline to be used for implementing matching sponsored game content to location by genre and playability. These examples do not constitute a limitation on the embodiments, which may be implemented using other components, modules, and configurations using the principles described herein. For example, any suitable game script algorithm may be used, and the tasks associated with matching game content with potential locations and brokering advertising content or sponsorship for game content based on location may be performed separately or in an integrated manner. Furthermore, actions discussed above may be performed in various orders, especially in an interlaced fashion.

Figure 5:
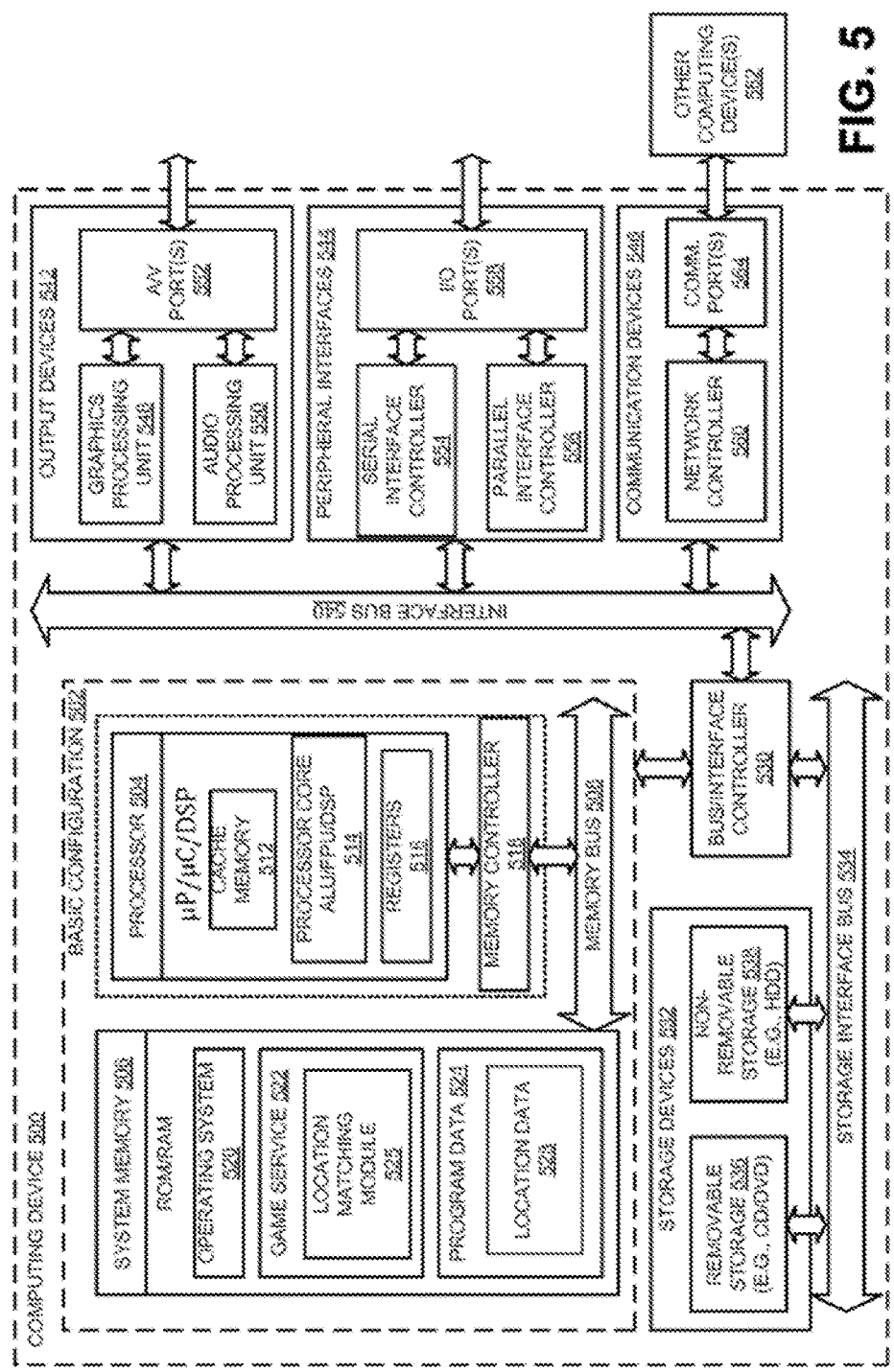
FIG. 5 illustrates a general purpose computing device, which may be used to implement matching sponsored game content to location by genre and playability.

FIG. 5 illustrates a general purpose computing device, which may be used to implement matching sponsored game content to location by genre and playability, arranged in accordance with at least some embodiments described herein. In a very basic configuration 502, a computing device 500 typically includes one or more processors 504 and a system memory 506. A memory bus 508 may be used for communicating between the processor 504 and the system memory 506.

Depending on the desired configuration, the processor 504 may be of any type including but not limited to a microprocessor (µP), a microcontroller (µC), a digital signal processor (DSP), or any combination thereof. The processor 504 may include one or more levels of caching, such as a cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, a game service 522, a location matching module 525, and program data 524. The program data 524 may further include location data 528. The location matching module 525 may match sponsored game content to location by genre and playability as described herein. This described basic configuration 502 is illustrated in FIG. 5 by those components within the inner dashed line.

The computing device 500 may have additional features or functionality, and additional interfaces to facilitate communications between the basic configuration 502 and any required devices and interfaces. For example, a bus/interface controller 530 may be used to facilitate communications between the basic configuration 502 and one or more data storage devices 532 via a storage interface bus 534. The data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., output devices 542, peripheral interfaces 544, and communication devices 546) to the basic configuration 502 via bus/interface controller 530. Some example output devices 542 include a graphics processing unit 548 and an audio processing unit 550, which may be configured to communicate to various external devices such as a display or speakers via one or more AN ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be co-located with each other, but each can be only with a machine that performs a portion of the program. In other examples, the human interaction can be automated such as by pre-selected criteria that are machine automated.

Figure 6:
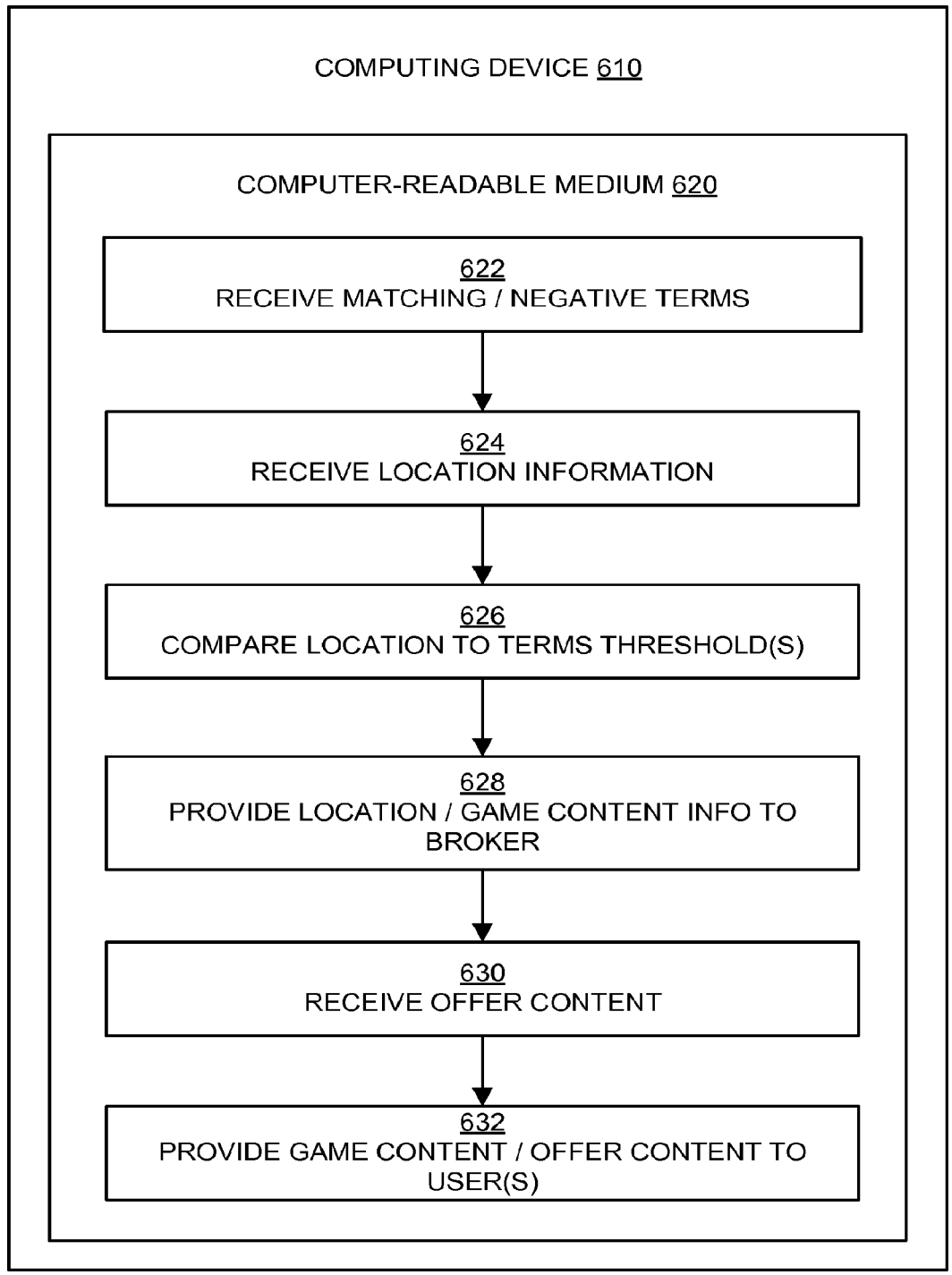
FIG. 6 is a flow diagram illustrating an example method for matching sponsored game content to location by genre and playability that may be performed by a computing device such as the device in FIG. 5.

FIG. 6 is a flow diagram illustrating an example method for matching sponsored game content to location by genre and playability that may be performed by a computing device such as the device in FIG. 5, arranged in accordance with at least some embodiments described herein. Example methods may include one or more operations, functions or actions as illustrated by one or more of blocks 622, 624, 626, 628, 630, and/or 632. The operations described in blocks 622 through 634 may also be stored as computer-executable instructions in a computer-readable medium such as computer-readable medium 620 of computing device 610.

The process of matching sponsored game content to location by genre and playability may begin at block 622, "RECEIVE MATCHING/NEGATIVE TERMS". At block 622, a game service such as the game service 104 in FIG. 1 may receive terms to be matched to potentially suitable game content and terms that are not desired to be associated (negative) with the potentially suitable game content.

Block 622 may be followed by block 624, "RECEIVE LOCATION INFORMATION." At block 624, a location matching module such as the location matching module 525 of FIG. 5 may receive location information from a variety of sources such as a GPS service, a wireless network, etc. for a user. Block 624 may be followed by block 626, "COMPARE LOCATION TO TERMS THRESHOLD(S)." At block 626, the location information and the matching and negative terms may be compared to distinct or same thresholds to determine suitable content. For example, a user may plan to be in a downtown area later in the evening and may have indicated interest in a murder mystery. The game service 104 may compare the terms murder and mystery, and the planned location to available game contents and determine one or more available games that incorporate locations (e.g., restaurants, hotels, art galleries) based on thresholds defined in a matching algorithm. According to some embodiments, spatial matching (location topology) may be provided to enable multiple players to select different routes between a start point and an end point for a game similar to the example scenario shown in FIG. 4.

Block 626 may be followed by block 628, "PROVIDE LOCATION/GAME CONTENT INFO TO BROKER." At block 628, candidate games and locations may be provided to a broker service such as the broker service 106 of FIG. 1. The broker service 106 may organize a keyword auction and select one or more highest bidders with matching locations for providing advertising or sponsorship for candidate games. Block 628 may be followed by block 630, "RECEIVE OFFER CONTENT." At block 630, offer content for the candidate games and locations may be received from one or more businesses such as the businesses 112 of FIG. 1.

Block 630 may be followed by block 632, "PROVIDE GAME CONTENT/OFFER CONTENT TO USER(S)." At block 632, the game service 104 may provide one or more candidate games with matching locations to a user's current or planned location and sponsored content from selected business(es) to the user.

The functions performed at the blocks in the above described process are for illustration purposes. Matching sponsored game content to location by genre and playability may be implemented by similar processes with fewer or additional functions. In some examples, the functions may be performed in a different order. In some other examples, various functions may be eliminated. In still other examples, various functions may be divided into additional functions, or combined together into fewer functions.

Figure 7:
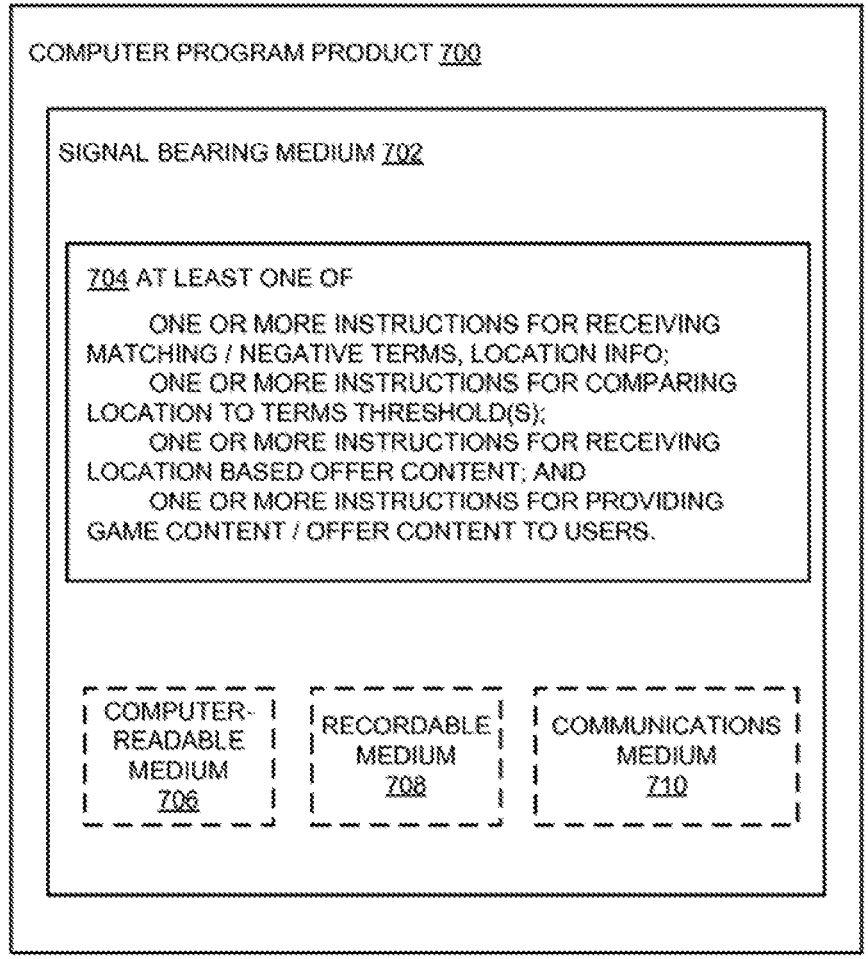
FIG. 7 illustrates a block diagram of an example computer program product, all arranged in accordance with at least some embodiments described herein.

FIG. 7 illustrates a block diagram of an example computer program product, arranged in accordance with at least some embodiments described herein. In some examples, as shown in FIG. 7, the computer program product 700 may include a signal bearing medium 702 that may also include machine readable instructions 704 that, when executed by, for example, a processor, may provide the functionality described above with respect to FIG. 5. Thus, for example, referring to the processor 504, the game service 522 and the location matching module 525 may undertake one or more of the tasks shown in FIG. 7 in response to the instructions 704 conveyed to the processor 504 by the medium 702 to perform actions associated with implementing matching sponsored game content to location by genre and playability as described herein. Some of those instructions may include receiving matching/negative terms and location information; comparing location to one or more terms thresholds; receiving location based offer content; and providing game content/offer content to users.

In some implementations, the signal bearing medium 702 depicted in FIG. 7 may encompass a computer-readable medium 706, such as, but not limited to, a hard disk drive (HDD), a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communication link, a wireless communication link, etc.). Thus, for example, the program product 700 may be conveyed to one or more modules of the processor 704 by an RF signal bearing medium, where the signal bearing medium 702 is conveyed by the wireless communications medium 710 (e.g., a wireless communications medium conforming with the IEEE 802.11 standard).

According to some examples, a method for matching sponsored game content to location may include receiving at least one of a matching term and/or a negative term, receiving location information associated with a user, determining suitable game content based on the at least one of a matching term and/or a negative term and the location information, determining an offer content based on the location information, and providing the suitable game content and the offer content.

According to other examples, the method may further include employing the matching term to provide a suitable ambiance and to increase a likelihood of one of related backgrounds or recognized keys for an Augmented Reality (AR) based game, where the suitable ambiance includes at least one of: lighting levels, local weather conditions, and surroundings. The method may also include employing the negative term to avoid undesirable game content or employing script-to-location matching to match a game plot against local features from map data to screen content such that the plot is executed across suitable backgrounds, transitions, and physical requirements. The script-to-location matching may employ online location maps to determine game plot paths from an existing or indicated location.

According to further examples, the method may include employing an ambiance matching and the script-to-location matching together, individually, or as part of a filtering system, where the filtering system includes one or more of a third party search engine, a content store, and/or a purchase recommendation engine. The method may also include providing the game content and the offer content through the filtering system. Determining an offer content based on the location information may include separating location information from game content, extracting contextual information for matching with auction key values, enabling a plurality of businesses to bid for the offer content through an auction, and selecting the offer content among ranked auction winners. Moreover, a keyword auction may be employed during a keyword related game organization that is also within user-related locations such that the game is configured with an auction winner's location as a plot-related location.

According to yet other examples, the method may include enabling a business to deliver a message to provide a discount on arrival, enabling one or more employees of a business to adopt roles in the game, providing multiple sponsored offerings, and ranking the sponsored offerings by a combination of values provided by one or more businesses. The method may further include employing a user travel related analysis in determining the game content and the offer content, where location based game content determination is one of automatic or subject to user confirmation.

According to other examples, a location based game content delivery system may include a game content server and an offer content server. The game content server may receive at least one of a matching term and/or a negative term, receive location information associated with a user, determine suitable game content based on the at least one of a matching term and/or a negative term and the location information, and provide the suitable game content and an offer content. The offer content server may receive location information associated with the user, determine the offer content based on the location information, and provide the offer content to the game content server.

According to some examples, the game content server may also employ the matching term to provide a suitable ambiance and to increase a likelihood of one of related backgrounds or recognized keys for an Augmented Reality (AR) based game, employ the negative term to avoid undesirable game content, or employ script-to-location matching to match a game plot against local features from map data to screen content such that the plot is executed across suitable backgrounds, transitions, and physical requirements. The script-to-location matching may employ online location maps to determine game plot paths from an existing or indicated location.

According to further examples, the game content server may employ an ambiance matching and the script-to-location matching together, individually, or as part of a filtering system, where the filtering system includes one or more of a third party search engine, a content store, and/or a purchase recommendation engine. The game content server may also provide the game content and the offer content through the filtering system. The offer content server may separate location information from game content, extract contextual information for matching with auction key values, enable a plurality of businesses to bid for the offer content through an auction, and select the offer content among ranked auction winners.

According other examples, the offer content server may employ a keyword auction during a keyword related game organization that is also within user-related locations such that the game is configured with an auction winner's location as a plot-related location, enable a business to deliver a message to provide a discount on arrival, or have business employees adopt appropriate roles in the game. The offer content server may also provide multiple sponsored offerings and rank the sponsored offerings by a combination of values provided by one or more businesses. The game content server may employ a user travel related analysis in determining the game content and the offer content.

According to further examples, a computer-readable storage medium may have instructions stored thereon for matching sponsored game content to location. The instructions may include receiving at least one of a matching term and/or a negative term, receiving location information associated with a user, determining suitable game content based on the at least one of a matching term and/or a negative term and the location information, determining an offer content based on the location information, and providing the suitable game content and the offer content.

According to some examples, the instructions may further include employing the matching term to provide a suitable ambiance and to increase a likelihood of one of related backgrounds or recognized keys for an Augmented Reality (AR) based game, where the suitable ambiance includes at least one of: lighting levels, local weather conditions, and surroundings. The instructions may also include employing the negative term to avoid undesirable game content and employing script-to-location matching to match a game plot against local features from map data to screen content such that the plot is executed across suitable backgrounds, transitions and physical requirements, where the script-to-location matching employs online location maps to determine game plot paths from an existing or indicated location.

The instructions may further include employing an ambiance matching and the script-to-location matching together, individually, or as part of a filtering system, providing the game content and the offer content through the filtering system, wherein the filtering system includes one or more of a third party search engine, a content store, and/or a purchase recommendation engine, separating location information from game content, extracting contextual information for matching with auction key values, enabling a plurality of businesses to bid for the offer content through an auction, and/or selecting the offer content among ranked auction winners.

According to further examples, the instructions may further include employing a keyword auction during a keyword related game organization that is also within user-related locations such that the game is configured with an auction winner's location as a plot-related location, enabling a business to deliver a message to provide a discount on arrival, providing multiple sponsored offerings, ranking the sponsored offerings by a combination of values provided by one or more businesses, and/or employing a user travel related analysis in determining the game content and the offer content. The data may be managed through a plurality of extensible virtual datacenters configured within the datacenter managing the data, and the instructions further include dynamically expanding the virtual datacenters in response to receiving additional analysis tasks. The instructions may also include receiving at least one of custom code and custom parameters to be used in conjunction with existing code for performing analysis tasks at the datacenter and providing a data owner at least one of a status message and an incoming data use client command as the data is analyzed.

According to yet other examples, a computing device for providing real-environment matched game content based at least partially on analyzed properties of potential locations may include a memory storing instructions and a processor coupled to the memory. The processor may execute a game content application and an offer content application. The game content application may receive at least one of a matching term and/or a negative term, receive location information associated with a user, match a game genre or statistically unlikely phrases against local descriptions based on the matching term, the negative term, and/or the location information, and provide the game content according to the matched game genre. The offer content application may receive the game content, separate location information from game content, extract contextual information for matching with auction key values, enable a plurality of businesses to bid for the offer content through an auction, and provide the offer content in conjunction with the game content. The game content application may also compare phrases from one of a search engine and/or local weather and time conditions to a game plot in order to match environmental ambiance to the game content.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to match sponsored game content to a location, the method comprising:
receiving a matching term and a negative term, wherein the matching term specifies a first location and a first ambiance suitable for a particular user or a game, wherein the negative term specifies a second location and a second ambiance unsuitable for the particular user or the game, and wherein the first ambiance and the second ambiance each include a time of day, weather, or one or more qualities associated with the first location and the second location, respectively;
receiving location information associated with the particular user, wherein the location information includes current location information obtained from a global positioning system (GPS) through a wireless or wired network coupled to a user device, and planned location information obtained from at least one of a scheduling service and a presence service through the wireless or wired network coupled to the user device;
determining suitable game content based on the matching term, the negative term, and the location information, wherein determining the suitable game content comprises:
comparing the matching term and the location information to a first threshold;
in response to a determination that the first threshold is met or exceeded, comparing the negative term and the location information to a second threshold; and
approving game content as the suitable game content in response to a determination that the game content does not conflict with the negative term beyond the second threshold;
determining an offer content based on the location information; and
providing the suitable game content and the offer content.

2. The method according to claim 1, further comprising:
employing the matching term to increase a likelihood of one of related backgrounds or recognized keys for an augmented reality (AR) based game.

3. The method according to claim 1, further comprising:
employing script-to-location matching to match a game plot against local features from map data to screen content such that the game plot is executed across suitable backgrounds, transitions, and physical requirements.

4. The method according to claim 3, wherein the script-to-location matching employs online location maps to determine game plot paths from an existing location or an indicated location.

5. The method according to claim 3, further comprising:
employing an ambiance matching and the script-to-location matching together, individually, or as part of a filtering system.

6. The method according to claim 5, wherein the filtering system includes one or more of a third party search engine, a content store, and/or a purchase recommendation engine.

7. The method according to claim 5, further comprising:
providing the suitable game content and the offer content through the filtering system.

8. A location based game content delivery system, comprising:
a game content server, the game content server comprising:
a communication module;
a memory circuit; and
one or more processors coupled to the memory circuit, the one or more processors configured to:
receive a matching term and a negative term, wherein the matching term specifies a first location and a first ambiance suitable for a particular user or a game, wherein the negative term specifies a second location and a second ambiance unsuitable for the particular user or the game, and wherein the first ambiance and the second ambiance each include a time of day, weather, or one or more qualities associated with the first location and the second location, respectively;

receive location information associated with the particular user, wherein the location information includes current location information obtained from a global positioning system (GPS) through a wireless or wired network coupled to a user device, and planned location information obtained from at least one of a scheduling service and a presence service through the wireless or wired network coupled to the user device;

determine suitable game content based on the matching term, the negative term, and the location information, wherein the determination of the suitable game content comprises:

comparison of the matching term and the location information to a first threshold;

in response to a determination that the first threshold is met or exceeded, comparison of the negative term and the location information to a second threshold; and approval of game content as the suitable game content in response to a determination that the game content does not conflict with the negative term beyond the second threshold; and provide the suitable game content and an offer content; and an offer content server, the offer content server comprising:

a communication module;

a memory circuit; and one or more processors coupled to the memory circuit, the one or more processors configured to:

receive the location information associated with the particular user;

determine the offer content based on the location information; and provide the offer content to the game content server.

9. The system according to claim 8, wherein the offer content server is further configured to:

separate the location information from the game content;

extract contextual information to match with auction key values;

enable a plurality of businesses to bid for the offer content through an auction; and select the offer content among ranked auction winners.

10. The system according to claim 9, wherein the offer content server is further configured to:

employ a keyword auction during a keyword related game organization that is also within user-related locations such that the game is configured with an auction winner's location as a plot-related location.

11. The system according to claim 8, wherein the offer content server is further configured to one or more of:

enable a business to deliver a message to provide a discount on arrival; and have business employees adopt appropriate roles in the game.

12. The system according to claim 8, wherein the offer content server is further configured to:

provide multiple sponsored offerings; and rank the multiple sponsored offerings by a combination of values provided by one or more businesses.

13. A non-transitory computer-readable storage medium with instructions stored thereon to match sponsored game content to a location, the instructions comprising:

receiving a matching term and a negative term, wherein the matching term specifies a first location and a first ambiance suitable for a particular user or a game, wherein the negative term specifies a second location and a second ambiance unsuitable for the particular user or the game, wherein the first ambiance and the second ambiance each include a time of day, weather, or one or more qualities associated with the first location and the second location, respectively;

receiving location information associated with the particular user, wherein the location information includes current location information obtained from a global positioning system (GPS) through a wireless or wired network coupled to a user device, and planned location information obtained from at least one of a scheduling service and a presence service through the wireless or wired network coupled to the user device;

determining suitable game content based on the matching term, the negative term, and the location information, wherein determining the suitable game content comprises:

comparing the matching term and the location information to a first threshold;

in response to a determination that the first threshold is met or exceeded, comparing the negative term and the location information to a second threshold; and approving game content as the suitable game content in response to a determination that the game content does not conflict with the negative term beyond the second threshold;

determining an offer content based on the location information; and providing the suitable game content and the offer content.

14. The non-transitory computer-readable storage medium of claim 13, wherein the instructions further comprise:

employing the matching term to increase a likelihood of one of related backgrounds or recognized keys for an augmented reality (AR) based game, wherein the suitable ambiance includes at least one of: lighting levels, local weather conditions, and surroundings.

15. A computing device to provide real-environment matched game content based at least partially on analyzed properties of potential locations, the computing device comprising:

a communication module;

a memory circuit that stores instructions; and one or more processors coupled to the memory circuit, the one or more processors configured to execute:

a game content application configured to:

receive a matching term and a negative term, wherein the matching term specifies a first location and a first ambiance suitable for a particular user or a game, wherein the negative term specifies a second location and a second ambiance unsuitable for the particular user or the game, wherein the first ambiance and the second ambiance each include a time of day, weather, or one or more qualities associated with the first location and the second location, respectively;

receive location information associated with the articular user, wherein the location information includes current location information obtained from a global positioning system (GPS) through a wireless or wired network coupled to a user device, and planned location information obtained from at least one of a scheduling service and a presence service through the wireless or wired network coupled to the user device;

match a game genre against local descriptions to determine suitable game content based on the matching term, the negative term, and/or the location information, wherein the determination of the suitable game content comprises:
  comparison of the matching term and the location information to a first threshold;
  in response to a determination that the first threshold is met or exceeded, comparison of the negative term and the location information to a second threshold; and
  approval of the matched game genre as the suitable game content in response to a determination that the matched game genre does not conflict with the negative term beyond the second threshold; and provide the suitable game content; and an offer content application configured to:
  receive the suitable game content;
  separate the location information from the suitable game content;
  extract contextual information for matching with auction key values;
  enable a plurality of businesses to bid for offer content through an auction; and
  provide the offer content in conjunction with the suitable game content.

16. The computing device of claim 15, wherein the game content application is further configured to:
  compare phrases from one of a search engine and/or local weather and time conditions to a game plot in order to match an environmental ambiance to game content.

17. The computing device of claim 15, wherein the game content application and the offer content application are further configured to:
  employ a user travel related analysis to determine game content and the offer content.

18. The computing device of claim 15, wherein location based game content determination is one of an automatic confirmation or subject to a user confirmation.

* * * * *

UNITED STATES PATENT AND TRADEMARK OFFICE
CERTIFICATE OF CORRECTION

| | | |
|---|---|---|
| PATENT NO. | : 9,662,587 B2 | Page 1 of 1 |
| APPLICATION NO. | : 13/498909 | |
| DATED | : May 30, 2017 | |
| INVENTOR(S) | : Kruglick | |

It is certified that error appears in the above-identified patent and that said Letters Patent is hereby corrected as shown below:

In the Specification

In Column 9, Line 61, delete "AN ports" and insert -- A/V ports --, therefor.

In the Claims

In Column 20, Line 9, in Claim 13, delete "game, wherein" and insert -- game, and wherein --, therefor.

In Column 20, Line 63-64, in Claim 15, delete "game, wherein" and insert -- game, and wherein --, therefor.

In Column 21, Line 2, in Claim 15, delete "articular" and insert -- particular --, therefor.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*